(12) United States Patent
Jönsson

(10) Patent No.: US 6,915,640 B2
(45) Date of Patent: Jul. 12, 2005

(54) METHOD AND A DEVICE FOR SUPPLYING FUEL TO A COMBUSTION CHAMBER

(75) Inventor: Bertil Jönsson, Bjärred (SE)

(73) Assignee: Volvo Aero Corporation, Trollhättan (SE)

( * ) Notice: Subject to any disclaimer, the term of this patent is extended or adjusted under 35 U.S.C. 154(b) by 77 days.

(21) Appl. No.: 10/604,475

(22) Filed: Jul. 24, 2003

(65) Prior Publication Data

US 2004/0094118 A1 May 20, 2004

Related U.S. Application Data

(63) Continuation of application No. PCT/SE01/02803, filed on Dec. 17, 2001, now abandoned.

(30) Foreign Application Priority Data

Feb. 6, 2001 (SE) ................................................ 0100369

(51) Int. Cl.$^7$ .................................................. F02C 9/26
(52) U.S. Cl. ........................................ 60/776; 60/739
(58) Field of Search .......................... 60/776, 734, 739, 60/39.281

(56) References Cited

U.S. PATENT DOCUMENTS

| 4,716,719 A | | 1/1988 | Takahashi et al. |
|---|---|---|---|
| 5,311,742 A | | 5/1994 | Izumi et al. |
| 5,402,634 A | * | 4/1995 | Marshall ....................... 60/776 |
| 6,330,789 B2 | * | 12/2001 | Onoda et al. .................. 60/773 |
| 6,425,239 B2 | * | 7/2002 | Hoffmann et al. ............. 60/776 |
| 2004/0088996 A1 | * | 5/2004 | Eroglu et al. .................. 60/776 |

FOREIGN PATENT DOCUMENTS

| FR | 2774455 A1 | 8/1999 |
|---|---|---|
| JP | 61079914 A | 4/1986 |
| JP | 1139919 A | 6/1989 |
| WO | WO 0183965 A1 | 11/2001 |

* cited by examiner

Primary Examiner—Ehud Gartenberg
(74) Attorney, Agent, or Firm—Novak Druce & Quigg, LLP

(57) ABSTRACT

Method and device (1) for supplying fuel to a combustion chamber that includes at least one main injector (3) and at least one pilot injector (2). The device includes a fuel tank (4), a line system (5) coupled from the fuel tank to the injectors (2, 3), a pump (6) for pumping fuel from the tank to the injectors, and a first regulator valve (7) for regulating the flow of fuel in a first line (8) in the system which is connected to the pilot injector (2). The device further includes a second regulator valve (9) for regulating the flow of fuel through a second line (10) in the system, which is connected to the pilot injector (2). The second regulator valve (9) is designed to regulate a substantially smaller flow than the first regulator valve (7).

9 Claims, 2 Drawing Sheets

METHOD AND A DEVICE FOR SUPPLYING FUEL TO A COMBUSTION CHAMBER

CROSS REFERENCE TO RELATED APPLICATIONS

This application is a continuation patent application of International Application No. PCT/SE01/02803 filed 17 Dec. 2001 now abandoned, which was published in English pursuant to Article 21(2) of the Patent Cooperation Treaty, and which claims priority to Swedish Application No. 0100369-8 filed 6 Feb. 2001. Said applications are expressly incorporated herein by reference in their entireties.

BACKGROUND OF INVENTION

1. Field of the Invention

The present invention relates to a method for supplying fuel to a combustion chamber which comprises (includes, but is not limited to) at least one main injector and at least one pilot injector, with a first flow of fuel being supplied to the pilot injector during start-up of the combustion chamber via a first regulator valve.

The invention also relates to a device for supplying fuel to a combustion chamber which comprises at least one main injector and at least one pilot injector. The device includes a fuel tank, a line system coupled from the fuel tank to the injectors, a pump for pumping fuel from the tank to the injectors, and a first regulator valve for regulating the flow of fuel in a first line in the system which is connected to the pilot injector.

The invention relates particularly to the supply of fuel to a combustion chamber of a gas turbine. In the conventional technology, the combustion chamber comprises a pilot injector which is arranged centrally, and a plurality of main injectors, for example 5, arranged about the pilot injector.

2. Background of the Invention

To start up a cold engine, a flame is ignited with the pilot injector in order to increase the temperature in the combustion chamber so that it is possible to obtain a working flame with the main injectors. When using the main injectors, the fuel is in fact intended to be combusted in evaporated form. To achieve evaporation, the combustion chamber has to be hot. The fuel from the pilot injector, by contrast, is intended to be combusted in liquid form, in the form of droplets. At start-up, a relatively large flow of fuel is supplied to the pilot injector. At intermediate and high load operation, by contrast, the pilot injector is intended to be supplied only with a small flow of fuel, which must nevertheless be sufficient to maintain a flame from the pilot injector and thereby ensure that the main injectors and the combustion chamber do not go out.

According to a previously known fuel supply device, a first regulator valve is used to regulate the flow of fuel to the main injectors and to the pilot injector. The device further includes a pressure regulator for cooperating with the first regulator valve for controlling the flow of fuel to the pilot injector. With this arrangement, however, it has been found difficult to control the flows to the main and pilot injectors in an exact way which, on one hand, prevents extinguishment of the combustion chamber and, on the other hand, ensures that emissions, such as CO, NOx, and uncombusted hydrocarbons, are kept to a low level. The combustion of the fuel in droplet form via the pilot injector is in fact associated with such emissions.

SUMMARY OF INVENTION

A first objective of the invention is to make available a method for supplying fuel to a combustion chamber which permits more exact control of the flow of fuel than possible using known systems. The aim in particular is to reduce the emissions compared to the known systems and to achieve improved safety against extinguishment of the combustion chamber at a low load operating state.

This objective is achieved by the fact that a second flow of fuel, which is substantially smaller than the first flow of fuel, is supplied to the pilot injector in order to achieve a specific operating state, distinct from start-up, via a second regulator valve that is designed to regulate a substantially smaller flow than the first regulator valve. In other words, a small valve (the second regulator valve) is used for regulating a small flow, and a large valve (the first regulator valve) is used for regulating a large flow to the pilot injector. This creates the conditions for achieving a regulation of the flow to the pilot injector that is more exact than in known systems. By virtue of this method, the supply of the fuel can be accurately controlled especially at transitions between different operating states.

According to a preferred embodiment, the first regulator valve is arranged to convey the first flow of fuel to the main injector when the combustion chamber is intended to be driven at an intermediate or high load state. At this intermediate or high load state, the pilot injector is thus supplied with a small flow of fuel via the second regulator valve. The first regulator valve is thus used to control a large flow of fuel to the pilot injector in a certain operating state and to the main injectors in another operating state. Controlling the supply of fuel in this way makes it possible to create the conditions for a cost-effective and space-saving fuel supply device.

According to a further development of the invention, the second regulator valve is arranged to convey the second, smaller flow of fuel to the pilot injector when the combustion chamber is intended to be driven at a low load state. Low-load operation can be used when the gas turbine and, as the case may be, the turbine's exhaust-gas heat exchanger are hot and therefore considerably less fuel is needed than at start-up.

A second objective of the invention is to provide a device for supplying fuel to a combustion chamber creating the conditions for more exact control of the flow of fuel than previously available. The aim, in particular, is to be able to further reduce the emissions and to achieve improved safety against extinguishment of the combustion chamber at a low load operating state.

This object is achieved by the inclusion of a second regulator valve for regulating the flow of fuel through a second line in the incorporating system that is connected to the pilot injector. This second regulator valve is designed to regulate a substantially smaller flow than the first regulator valve.

BRIEF DESCRIPTION OF DRAWINGS

The invention will be described in greater detail below with reference to the attached drawings in which.

DETAILED DESCRIPTION

Figure 1:
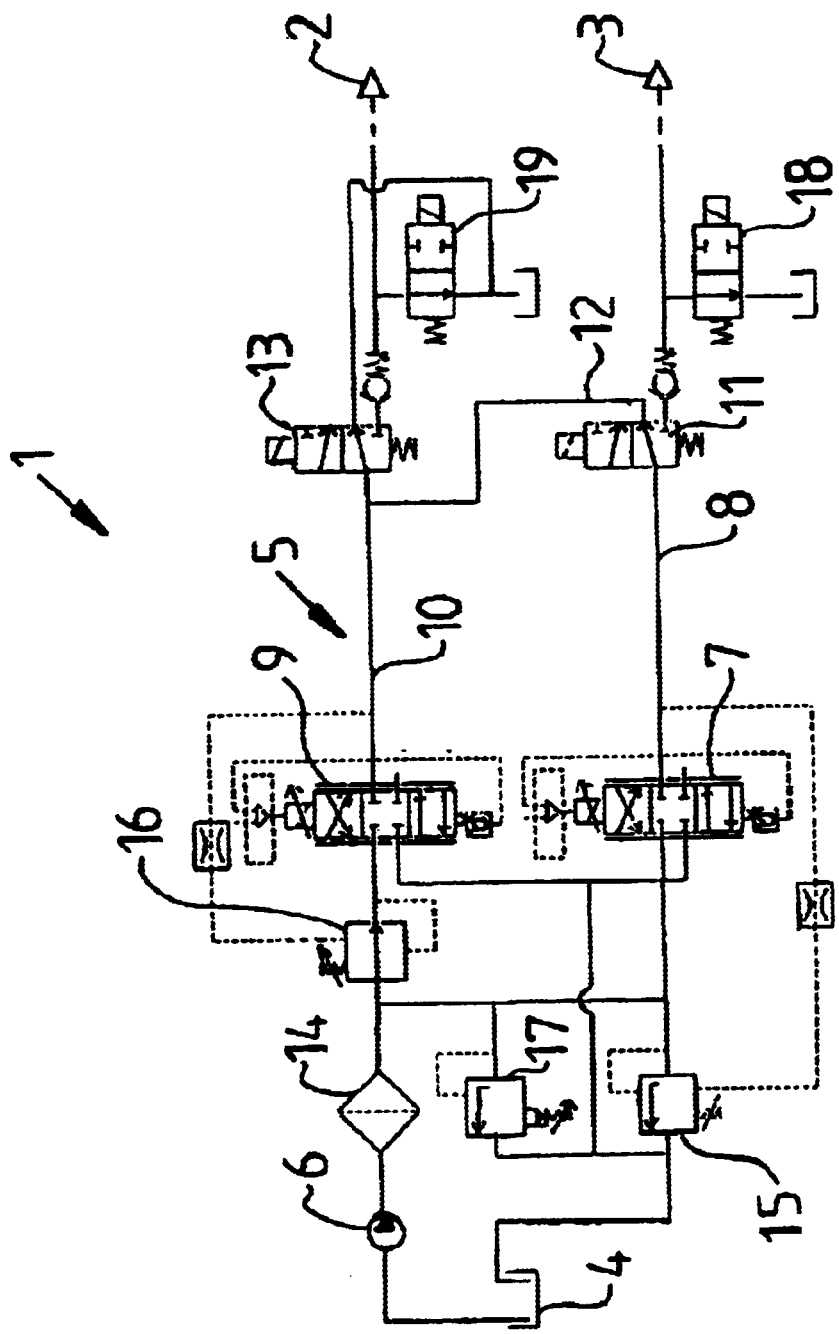
FIG. 1 is a schematic illustration of a preferred embodiment of a device for supplying fuel to a combustion chamber of a gas turbine configured according to the teachings of the present invention(s)

FIG. 1 illustrates a preferred embodiment of a device 1 for supplying fuel to a combustion chamber of a gas turbine.

The combustion chamber is of the low-emission type and has a centrally arranged pilot injector and a plurality of main injectors arranged thereabout. In FIG. 1, the pilot injector 2 and the main injectors 3 are illustrated schematically.

The size of the flows of fuel supplied to the injectors 2, 3 depends on the intended operating state of the incorporating engine. When starting up a cold engine, and possibly at a low load state, a relatively large flow of fuel is supplied to the pilot injector and essentially no fuel is supplied to the main injectors. At the intermediate and high load states, by contrast, the pilot injector is supplied with a small flow of fuel and the main injectors are supplied with a large flow of fuel. In the latter case, the pilot injector is used as a safety against the system extinguishing. The difference in the size of the flows of fuel to the pilot injector at start-up and with the main injector coupled-in is especially accentuated when the gas turbine is designed for exhaust-gas heat exchange.

A device or system configured according to the present invention comprises a fuel tank 4, a line system 5 coupled from the fuel tank 4 to the injectors 2, 3, a pump 6 for pumping fuel from the tank to the injectors, and a first regulator valve 7 for regulating the flow of fuel in a first line 8 in the system which is connected to the main injectors 3.

The device further comprises a second regulator valve 9 for regulating the flow of fuel through a second line 10 in the system, which is connected to the pilot injector 2. The second regulator valve 9 is designed to regulate a substantially smaller flow than the first regulator valve. The second regulator valve 9 is preferably designed to regulate a flow which is at least less than 20%, and preferably less than 10% of the flow which the first regulator valve 7 is designed to regulate.

The first line 8 is also connected to the pilot injector 2 for regulating the flow to that injector 2 with the aid of the first regulator valve 7. For this purpose, the device comprises a directional valve 11 arranged downstream of the first regulator valve 7. Via the directional valve 11, the flow of fuel from the first regulator valve 7 can be conveyed to the pilot injector 2 via an intermediate line 12.

The supply of fuel from the tank 4 to the injectors 2, 3 is described below in three different operating states, namely start-up, normal running (intermediate and high load operation) and low load operation (idling and engine-brake operation).

At start-up of the engine, particularly when configured as a gas turbine, the first regulator valve 7 is open to allow throughflow, and the second regulator valve 9 is closed. A relatively large flow of fuel is then conveyed from the tank 4 via a filter 14 to the first line 8 and through the first regulator valve 7. The fuel is conveyed onward to the pilot injector 2 in the intermediate line 12 via the first directional valve 11 and a second directional valve 13. In other words, the directional valve 11 in this case is configured to convey the fuel to the intermediate line 12.

At intermediate and high load operation, both the first regulator valve 7 and the second regulator valve 9 are open to allow throughflow. The first directional valve 11 is now designed to convey the relatively large flow of fuel from the first regulator valve 7 to the main injectors 3. In comparison, a smaller flow of fuel is conveyed in the second line 10 through the second regulator valve 9 and the second directional valve 13 to the pilot injector 2.

At low load operation, the first regulator valve 7 is closed and the second regulator valve 9 is open. A relatively small flow is now conveyed in the second line 10 through the second regulator valve 9 and the second directional valve 13 to the pilot injector 2.

To be able to regulate the flow with the regulator valves 7, 9 with great accuracy independently of the pressure level downstream of the regulator valves (which is principally defined by the combustion chamber pressure and the pressure drop across the injectors 2, 3), the device further includes valves 15, 16 intended to maintain a constant pressure drop across the regulator valves. In the present case, a pressure control valve 15 with overflow function is used for the first regulator valve 7, and a pressure control valve 16 with a throttle function is used for the second regulator valve 9. In the present case where only one pump is used, the setting of the pressure control valves 15, 16 is chosen such that, at all the operating states, the pressure control valve 15 with overflow function maintains a pressure upstream of the regulator valves which is higher than or equal to the pressure which is required upstream of the second regulator valve 9.

In the preferred embodiment according to FIG. 1, a pressure-limiting valve 17 is also shown which protects the system against dangerously high pressure. Drainage valves 18, 19 are provided for draining fuel from the injectors when shutting-off from the combustion chamber.

Figure 2:
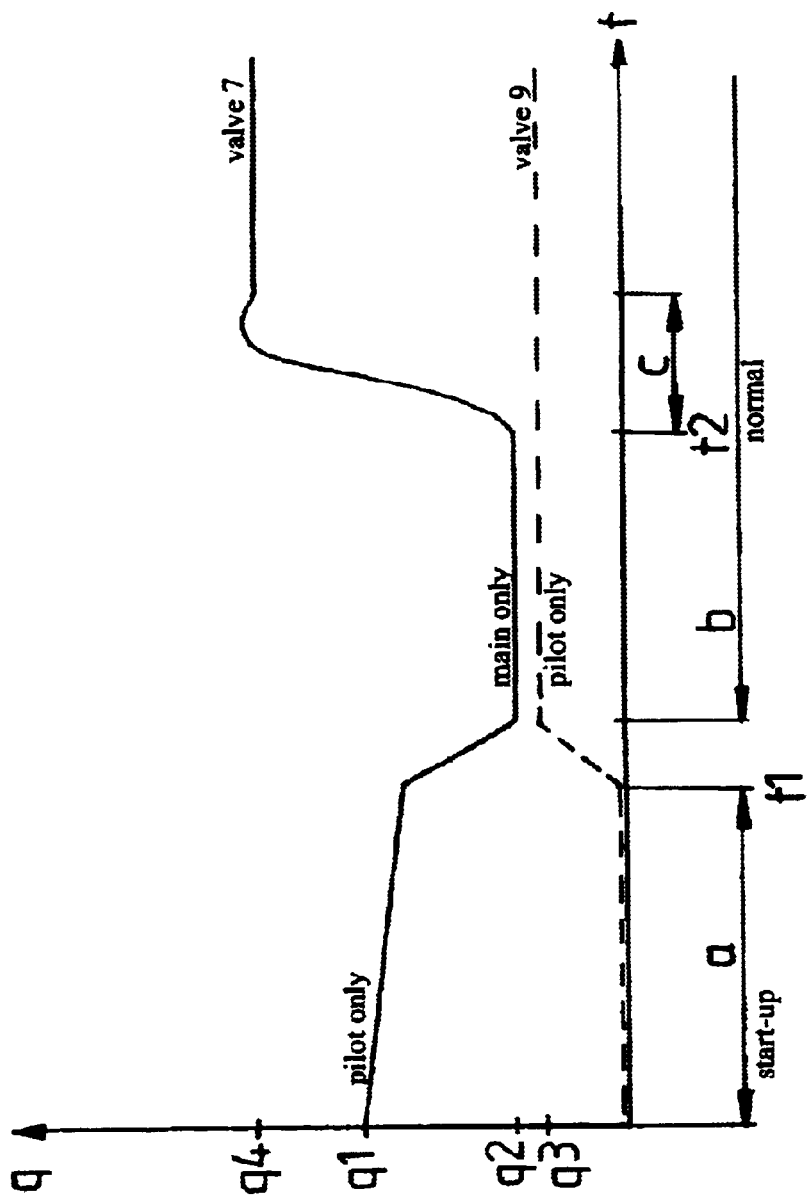
FIG. 2 is a graphical representation of the flows of fuel to the pilot injector and the main injectors in accordance with one operating example of the disclosed inventions(s).

FIG. 2 shows a graph illustrating an example of the flows of fuel to the pilot injector 2 and the main injectors 3, respectively. The vertical axis indicates the flow, q, and the horizontal axis indicates the time, t. The solid line shows the flow through the first regulator valve 7, and the broken line shows the flow through the second regulator valve 9. The marked period, a, indicates the start-up phase and, b, the marked period, indicates normal operation. Between the start-up phase and normal operation, ramping of the flows takes place in order to achieve a gentle transition between the different operating states. During the start-up phase, a relatively large flow of fuel q1 is supplied to the pilot injector 2 via the first regulator valve 7. The flow is reduced slightly during the start-up phase as the engine heats up with time. No fuel is supplied to the main injectors 3 during the start-up phase. When the intake air to the combustion chamber is sufficiently hot for combustion to be able to take place with the main injectors 3 in the manner intended, these are coupled in (brought into operation). At the time, t1, a transition begins from the start-up phase to normal operation. After the transition, the main injectors 3 are supplied with the flow, q2, via the first regulator valve 7 and the pilot injector 2 is supplied with a smaller flow, q3, via the second regulator valve 9. At the time, t2, there is also an acceleration phase, c, during which the flow to the main injectors 3 is greatly increased to a level, q4, which corresponds to high load operation.

As FIG. 2 illustrates, variations in flow occur in what is referred to above as the second flow. The expressions first flow and second flow are in other words intended to signify two flow intervals at different levels. Within the flow interval of, for example, the second flow, the specific flow can be controlled to obtain different desired values.

The invention must not be regarded as being limited to the embodiment described above, and instead a number of further variants and modifications are conceivable within the scope of the attached patent claims.

For example, the constant-pressure regulation can be achieved in another way, for example, by using two pumps, and in which case a suitable pressure drop across the regulator valves can be chosen independently of the pressure levels in the line to the main injector and pilot injector, respectively.

What is claimed is:

1. A method for supplying fuel to a combustion chamber comprising:

providing at least one main injector (3) and at least one pilot injector (2), with a first flow of fuel being supplied to the pilot injector during start-up of the combustion chamber via a first regulator valve (7), and wherein a second flow of fuel, which is substantially smaller than the first flow of fuel, is supplied to the pilot injector (2) in order to achieve a specific operating state, distinct from start-up, via a second regulator valve (9) which is designed to regulate a substantially smaller flow than the first regulator valve (7); and arranging the first regulator valve (7) to convey the first flow of fuel to the main injector (3) via a directional valve (11) when the combustion chamber is intended to be driven at an intermediate or high load state.

2. The method as recited in claim 1, further comprising:

arranging the second regulator valve (9) to convey the second, smaller flow of fuel to the pilot injector (2) when the combustion chamber is intended to be driven at an intermediate or high load state.

3. The method as recited in claim 1, further comprising:

arranging the second regulator valve (9) to convey the second, smaller flow of fuel to the pilot injector (2) when the combustion chamber is intended to be driven at a low load state.

4. The method as recited in claim 1, further comprising: arranging the combustion chamber in a gas turbine.

5. An arrangement for supplying fuel to a combustion chamber comprising:

at least one main injector (3) and at least one pilot injector (2), a fuel tank (4), a line system (5) coupled from the fuel tank to the injectors (2, 3), a pump (6) for pumping fuel from the tank to the injectors, and a first regulator valve (7) for regulating the flow of fuel in a first line (8) in the system which is connected to the pilot injector (2);

a second regulator valve (9) configured to regulate the flow of fuel through a second line (10) in the system that is connected to the pilot injector (2), said second regulator valve (9) configured to regulate a substantially smaller flow than the first regulator valve (7); and said first line (8) being connected to the main injector (3) for regulating the flow to the latter with the aid of the first regulator valve (7) and a directional valve (11) located downstream of the first regulator valve, and an intermediate line (12) connecting the first and second line (8,10) for conveying the fuel flow to at least one of the main injector (3) and the pilot injector (2).

6. The arrangement as recited in claim 5, further comprising:

the second regulator valve (9) configured to regulate a flow that is at least less than 20% of the flow regulated by the first regulator valve (7).

7. The arrangement as recited in claim 5, further comprising:

the second regulator valve (9) configured to regulate a flow that is at least less than 10% of the flow regulated by the first regulator valve (7).

8. The arrangement as recited in claim 5, wherein the arrangement is configured to supply fuel to the combustion chamber of a gas turbine.

9. The arrangement as recited in claim 8, wherein the gas turbine further comprises an exhaust-gas heat exchanger.

* * * * *